Nov. 8, 1932.    R. H. CHURCHILL    1,887,287
SHOCK ABSORBING MECHANISM
Filed Sept. 30, 1929    2 Sheets-Sheet 1

Witness
H. F. McKnight

Inventor.
Ralph H. Churchill
by Burton & Burton
his Attorneys.

Nov. 8, 1932.                R. H. CHURCHILL                1,887,287
                         SHOCK ABSORBING MECHANISM
                      Filed Sept. 30, 1929     2 Sheets-Sheet 2

Witness.
H. T. McKnight

Inventor.
Ralph H Churchill
by [signature]
his Attorneys.

Patented Nov. 8, 1932

1,887,287

UNITED STATES PATENT OFFICE

RALPH H. CHURCHILL, OF CHICAGO, ILLINOIS

SHOCK ABSORBING MECHANISM

Application filed September 30, 1929. Serial No. 396,025.

The purpose of this invention is to provide an improved shock absorbing system for a road vehicle such as an automobile or motor truck which will not only function as a shock absorber but will also tend to eliminate or minimize the longitudinal rocking movement of the vehicle caused by the front and rear wheels successively encountering a bump or depression in the roadway. It consists of certain linkage interconnecting the front and rear wheels or their axles including a dashpot or snubbing device in the linkage in a manner herein shown and described and indicated by the claims.

In the drawings:—

Figure 1:
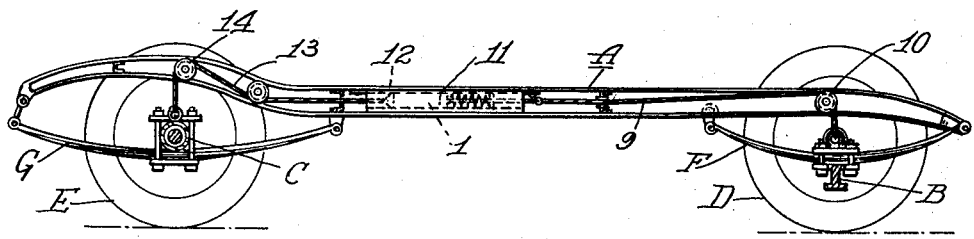
Figure 1 is a diagrammatic vertical section of a vehicle frame and running gear showing the application of my invention thereto.

In Figure 1 the vehicle frame is represented at A with a front axle B and rear axle C. One of the front wheels is shown at D and one rear wheel at E. The front axle is attached to the frame and supports it through the medium of a semielliptical spring F of conventional design, and similarly the rear axle is connected to the frame by a spring G. The conventional shock absorbing device usually permits the spring, such as the wheel D spring F, to be compressed as the wheel D encounters a bump in the road, but to avoid the recoil shock to the vehicle frame which would result if the spring were allowed to return freely from its compressed position and thus vibrate past its normal position, the shock absorbing mechanism acts as a damper to retard the return movement so that the spring shall merely regain its normal initial form. If this is accomplished rather quickly, the vehicle frame and the load which it carries is sustained by its own inertia of movement in the direction of travel so that it scarcely deviates from a horizontal plane. But in actual practice there is always some movement of the vehicle frame up and down in response to the encounter of an irregularity by the wheel. This vertical movement first affects the front end of the vehicle and then a moment later similarly affects the rear end of the vehicle, resulting in a longitudinal rocking of the vehicle frame and body which might be described as a "galloping" motion, and such action is more noticeable in vehicles of relatively short wheel base because they experience a greater change of angle for a given deviation in the road surface.

The purpose of this invention is to control and so far as possible eliminate this galloping motion. The drawings illustrate a shock absorber of simple, conventional construction comprising a cylinder 1 containing a piston 2 which is normally urged toward one end of the cylinder by a coil spring 3. The cylinder contains a quantity of oil, indicated at 4, which must pass through a port 5 in the piston to permit movement of the latter. The passage of the oil is freely permitted in one direction by a check valve 6 controlling the port 5, but when the piston moves in the opposite direction, the valve closes and the passage of oil is permitted only through the restricted port 7 in the check valve.

As shown, the piston rod 8 is connected by a flexible link 9 to the front axle, and since the cylinder 1 is shown mounted in horizontal position on the vehicle frame, the connecter 9 passes over a pulley 10 and thence downward to the axle B. If the front wheels strike a rise or obstruction in the road, the front spring F is compressed, thus slackening the flexible connecter 9 and permitting the piston to move toward the rear end of the cylinder 1 under the stress of the spring 3. Then as the wheels pass the bump in the road and the axle B tends to move downwardly away from the frame A, the corresponding recoil movement of the spring F is checked by the restricted flow of oil through the piston 2.

If the cylinder 1 were fixedly mounted on the frame, the arrangement would be substantially that of the conventional shock absorbing device as applied to the front axle; but as indicated in Figure 1, the cylinder 1 is slidably carried in a guide tube or sleeve 11, which itself is fixedly secured to the frame A permitting longitudinal movement of the shock absorber cylinder bodily on the frame. The cylinder 1 is provided with an eye 12 at its closed end opposite the end through which the piston rod 8 extends, and a flexible connecter 13 extends from the eye 12 to the rear axle G passing over a pulley 14 similar to the pulley 10 at the forward end. With this arrangement the recoil force of the front spring F as it tends to return from compressed position to its normal form, being unable to move the piston 2 rapidly enough in the cylinder 1, pulls the cylinder bodily forward in the guide tube 11 and through the flexible connecter 13 pulls up on the rear axle C, thus compressing the rear spring G. At this instant, (assuming that the vehicle wheels have not actually left the road surface in negotiating the bump which caused compression of the front springs), the forward end of the frame is starting downward as the wheels pass over the bump and before the front springs have had time to return to normal. This causes a downward dip of the front end of the vehicle, but with my linkage, just described, the rear end of the vehicle frame is drawn downwardly by the partial recoil of the front springs, so that both front and rear ends of the frame are moving downward at the same time, thus greatly lessening the change of angle which would otherwise result from the downward dipping of the front end.

In other words, the frame and body of the vehicle tend to remain level as a result of the compensating action of the linkage, although the frame may rise and fall in response to irregularities of the road. This mere vertical movement is much less tiring to the occupants of the vehicle than the galloping action which results in a constant change of angle of the backs of the seats as well as the seats themselves, thus tending to throw the occupants forward in their seats with each road shock experienced by the wheels.

It will be evident that as the restricted leakage of oil through the port 7 continues, the tension on the flexible connecters 19 and 13 will move the piston 2 back to its normal position in the cylinder 1 and the total linkage extending from one axle to the other will thus be elongated to permit both axles to resume their normal relation to the frame A. Usually this will occur before the rear axle reaches the bump of the road surface already encountered by the front wheels, and as the rear wheels ride over this same bump, the action of my shock absorbing linkage will be repeated. The slackening of the flexible connecter 13 will permit the piston 2 to move toward the closed end of the cylinder 1 under stress of its spring 3, thus shortening the complete linkage between the two axles, and then the recoil of the rear spring G will operate through the linkage to pull up on the front axle, resulting in a lowering of the front end of the frame to correspond with the lowering of the rear and as the rear wheels ride down over the pump onto the more level road surface.

If the rear wheels should encounter the obstruction before the springs have fully recovered, the same action will take place, but at a slightly different point in the range of the springs, and in the range of the dashpot cylinder device, but in any event, the tendency will be to hold the frame as nearly level as possible as it rides over the irregularity in the road.

Upon encountering a depression in the road surface, unless the vehicle is driven so rapidly that the wheels practically jump across the depression, there is a tendency for them to follow down in contact with the road surface. If this permits the front springs to expand, there will be a tendency to move the piston 2 forward in its cylinder, but since in this direction only the restricted flow of oil can take place through the port 7, the tension on the piston rod 8 will be transmitted through the dashpot cylinder to the connecting link 13, tending to draw up on the rear axle and thus having the effect of lowering the rear end of the frame as the front end settles back onto the expanded front springs. That is, if the vehicle body has time to move downward in response to the depression in the road, it will tend to move downward substantially parallel to itself without the galloping or rocking action which would result if the front and rear axles were not interconnected in accordance with my invention.

Obviously, the encounter of the front wheels with the opposite side of a depression is similar to an encounter with a bump or obstacle in the road surface, and will react on the springs and shock absorbing system in the manner already described.

Figure 3:
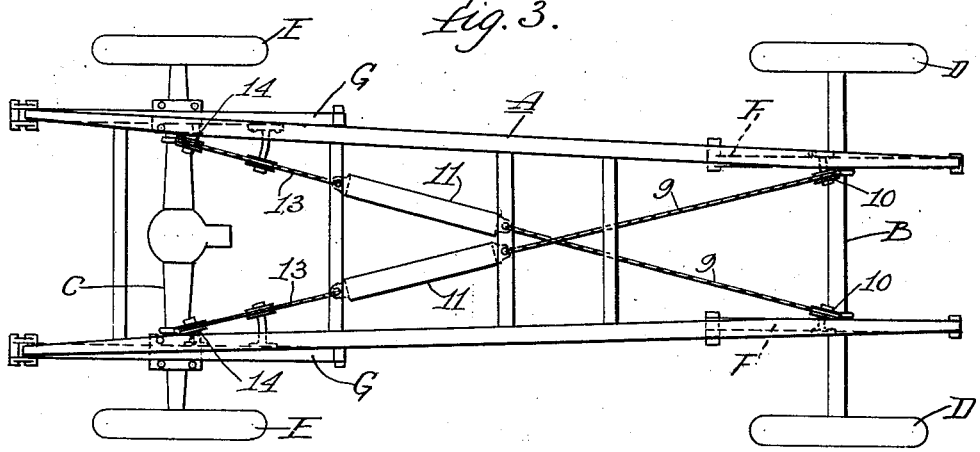
Figure 3 is a diagrammatic plan view of a modification.

Since obstacles or depressions in the road frequently affect only one wheel of a pair, it will be evident that if the linkage shown in Figure 1 were simply duplicated at each side of the vehicle, the up or down movement of the left front wheel would result in corresponding movement of the left rear end of the frame without so much effecting the right-hand portion of the frame, and this might result in a lateral rocking movement of the body as a whole which would be unpleasant. Therefore, it may be desirable to extend the two linkages diagonally with respect to the vehicle so that the right-hand portion of the front axle is connected to the left-hand portion of the rear axle through a dashpot device or the like, such as the cylinder 1; and similarly the left-hand part of the front axle is linked to the right-hand portion of the rear axle. In this manner the one-sided road shocks will be compensated by the diagonal transmission of their effects through the frame, and, of course, where both front and rear wheels encounter an irregularity together, the reaction will affect both ends of the rear axle simultaneously. This diagonal arrangement is illustrated diagrammatically in Figure 3.

Thus it will be seen that I have provided a stabilizing system for spring supported vehicles in which the reaction at one end of the vehicle is transmitted to the other end in a manner tending to avoid undue disturbance of the body; and incidentally, a single shock absorbing device is made to serve where heretofore two separate devices have been provided.

Figure 4:
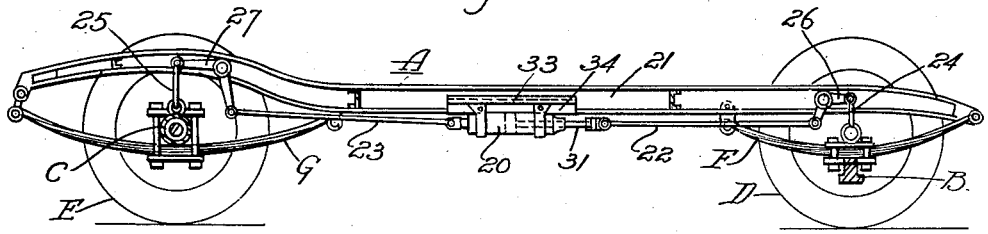
Figure 4 is a diagrammatic vertical section of the vehicle frame and running gear showing a modified form of my invention applied thereto.
Figure 5:
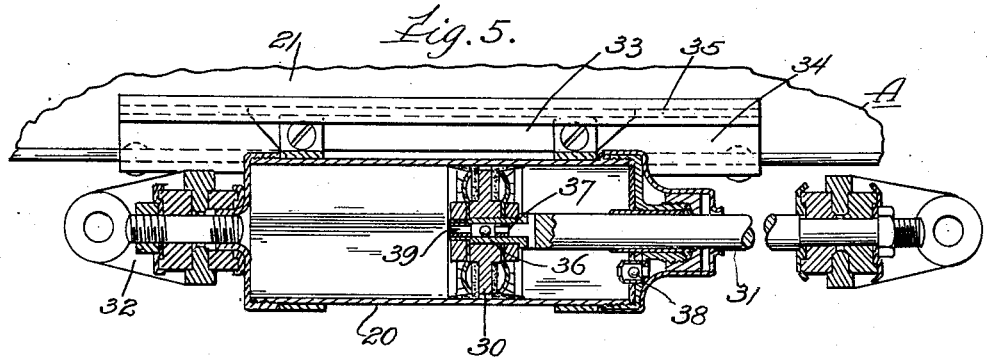
Figure 5 is a vertical sectional view of the two-way shock absorber shown in Figure 4.

The structure shown in Figures 4 and 5 is included to indicate the possibility of using a so-called "two-way" shock absorber in accordance with the principles of my invention. In this arrangement the shock absorber cylinder, 20, is shown mounted on the frame, 21, and instead of flexible cables I have provided rigid link connections, 22, 23, 24 and 25, to the front and rear axles operating through bell cranks, 26 and 27, instead of over pulleys. This linkage will thus transmit motion in either direction from the axles to the shock absorber, 20.

For purposes of illustration the shock absorber itself is of the air dash pot type having within the cylinder, 20, a piston, 30, whose piston rod, 31, is connected to the link, 22, while the cylinder itself is provided with an attachment lug, 32, to which the link, 23, is pivotally secured. The cylinder, 20, is carried on a base or support, 33, mounted slidably in a guide member, 34, whose undercut guide-way, 35, is indicated in dotted lines in Figure 5. The cylinder, 20, is thus capable of bodily movement longitudinally of the vehicle while its piston is movable within the cylinder subject to the retarding action of the air therein. A check valve, 36, in the piston is adapted to seat against the port, 37, but can only partially seal this port because of a bleed groove therein permitting retarded motion of the piston toward the closed end of the cylinder. Retarded movement in the other direction is permitted by partial leakage at the check valve, 38, while the valve, 36, seals the port, 39, of the piston, 30.

A shock absorber of this type does not yield immediately to compression of the vehicle springs at either end of the car, but such compression will be transmitted through the linkage to the axle at the opposite end. Thus if the front wheels encounter a bump and the springs do not immediately compress, the front end of the car will tend to rise in riding over the bump. But actually the springs will compress to some extent causing bodily movement of the cylinder, 20, in a forward direction which rocks the bell crank, 27, in a direction for spreading apart the frame and its rear springs, thus tending to raise the rear end of the car by an amount corresponding to the height of the bump not compensated for by compression of the front springs. In other words, the linkage tends to maintain the car frame in a level position although it may move vertically in response to road irregularities. Any stresses set up in the connecting linkage between the two axles will be absorbed to some extent by the retarded response of the piston, 30, in its cylinder, 20, and strains set up in the springs of the vehicle will be gradually relaxed through the shock absorbing action of this mechanism. That is, it will operate as a shock absorber to the same extent as though it were applied to a single spring of the vehicle, but will serve this purpose for both front and rear springs by virtue of the connecting linkage.

Figure 2:
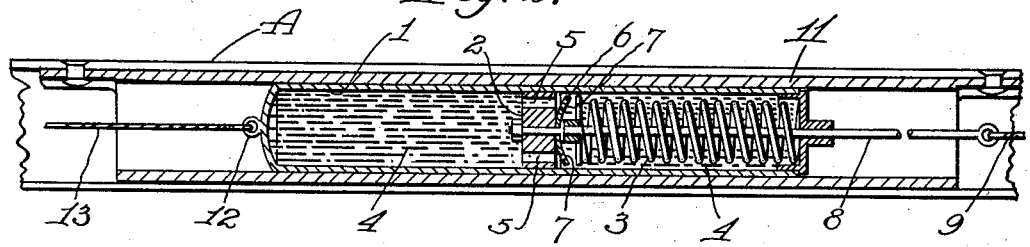
Figure 2 is an enlarged vertical section of the dashpot device.
Figure 6:
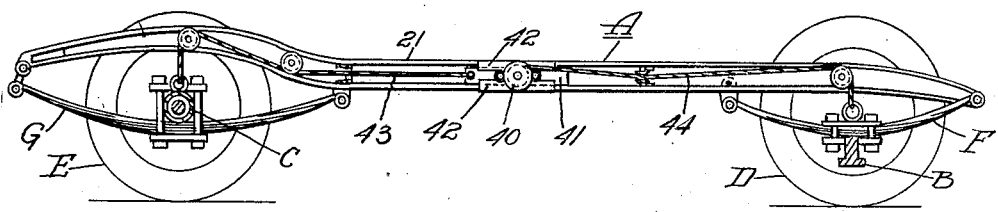
Figure 6 is a diagrammatic vertical section similar to Figure 1, illustrating the application of the snubber type shock absorber as an element of my invention.

Figure 6 is added merely to illustrate the possibility of using the rotary "snubber" type of shock absorber in place of the dash pot type. The diagram is similar to Figure 1 except that a cylindrical casing of a snubber type shock absorber is shown at 40, mounted on a base block, 41, which is longitudinally slidable in guides, 42, on the frame of the vehicle. A cable, 43, connects the base block, 41, with the rear axle and a cable, 44, extends from within the circular casing, 40, to a connection with the front axle. It will be understood that tensioning wind up means within the casing, 40, operate to reel in the cable, 41, whenever tension therein is relaxed and then to pay it out yieldingly to retard the recoil of the vehicle spring. This corresponds to the yielding return of the cable, 9, and piston, 2, of the dash pot device of Figures 1 and 2, and controls the axle and frame movements in substantially the same manner.

I claim:

1. In combination with a vehicle frame and two axles associated therewith, springs by which said axles are connected to the frame and shock absorbing mechanism comprising a dashpot device movably mounted on the frame and including a casing with a member movable relative thereto, together with linkage connecting the casing to one of the axles, and linkage connecting said movable member with the other axle whereby the recoil movement of one axle is transmitted through the shock absorbing device to the other axle.

2. In combination with a vehicle frame, two longitudinally spaced axles and springs by which they are connected to said frame, together with linkage connecting said axles under an initial tension adapted to shorten automatically when said tension is relaxed, said linkage including means for yieldingly resisting its elongation with a force greater than said initial tension for retarding said elongation when the tension is resumed or increased.

3. In combination with a vehicle frame with front and rear axles and springs by which the frame is supported on said axles, linkage connecting said axles with a take-up device in said linkage adapted to shorten it automatically when the tension is relaxed, but arranged to permit the linkage to elongate at a slower rate, said take-up device employing a sufficiently firm grip to render the shortened linkage effective for compressing the vehicle springs.

4. In combination with a vehicle frame and two axles associated therewith, springs by which said axles are connected to the frame and shock absorbing mechnism movably mounted on the frame and including a casing, a member movable relatively thereto and means for retarding such relative movement in either direction with sufficient force for compressing one or more of the vehicle springs; together with linkage guided on the frame and connecting the casing to one of the axles and connecting said movable member with the other axle, whereby movements of one axle are distributed through said shock absorbing mechanism to the other axle and to the frame.

5. In combination with a vehicle frame, front and rear axles therefor, and springs by which said axles are connected to the frame, a linkage connecting said axles and including a two-way shock absorber serving as a non-positive element of said linkage adapted to change its own effective length under stress, but to yieldingly resist and delay such change in either direction, whereby said linkage is arranged to employ the recoil of the springs at one axle to compress the springs associated with the other axle.

6. In combination with a vehicle frame, front and rear axles therefor, and springs by which said axles are connected to the frame, a linkage connecting said axles but operative for transmitting motion between them in one direction only, said linkage permitting compression of the springs at either axle without affecting the other but employing the recoil of the springs at one axle to compress the springs associated with the other.

7. In combination with a vehicle frame, front and rear axles therefor and springs by which said axles are connected to the frame, a linkage connecting said axles including an automatic take-up device whereby compression of a spring at either axle is permitted without affecting the spring or springs at the other axle, but the linkage is shortened during such compression so as to employ the recoil of the compressed spring for compressing the other spring or springs.

8. In combination with a vehicle frame, front and rear axles therefor and springs by which said axles are connected to the frame, a linkage connecting said axles and adapted to transmit movement from one axle to the other in one direction only including spring means under an initial tension operating to shorten the linkage automatically when said initial tension is relaxed as by compression of the vehicle springs at one axle, and including a non-positive connection through which motion is transmitted by the linkage so that recoil of the springs at one axle serves to compress the springs at the other axle while said non-positive connection permits gradual elongation of the linkage as the parts return to their normal positions.

RALPH H. CHURCHILL.